United States Patent

Münkel

[11] Patent Number: 5,972,210
[45] Date of Patent: Oct. 26, 1999

[54] BYPASS-MOUNTED FILTER ASSEMBLY

[75] Inventor: Karlheinz Münkel, Oberderdingen-Flehingen, Germany

[73] Assignee: Argo GmbH Fuer Fluidtechnik, Kraichtal, Germany

[21] Appl. No.: 08/939,262

[22] Filed: Sep. 29, 1997

Related U.S. Application Data

[63] Continuation of application No. PCT/EP96/00996, Mar. 8, 1996.

[30]   Foreign Application Priority Data

Mar. 29, 1995   [DE]   Germany ........................... 195 11 450

[51] Int. Cl.⁶ ................................................... B01D 35/26
[52] U.S. Cl. ........................... 210/90; 210/136; 210/238; 210/416.5; 210/438; 210/440; 210/450; 210/454
[58] Field of Search .............................. 210/90, 136, 168, 210/234, 235, 248, 416.1, 416.4, 416.5, 430, 438, 443, 450, 454, 342, 440, 238

[56]   References Cited

U.S. PATENT DOCUMENTS

| | | | |
|---|---|---|---|
| 1,407,763 | 2/1922 | Langston | 210/234 |
| 3,736,075 | 5/1973 | Otto | 210/416.1 |
| 5,085,769 | 2/1992 | Klausen et al. | 210/438 |
| 5,458,767 | 10/1995 | Stone | 210/90 |

FOREIGN PATENT DOCUMENTS

| | | |
|---|---|---|
| 2125952 | 9/1972 | France . |
| 31 22 047 | 12/1982 | Germany . |
| 39 03 675 | 8/1990 | Germany . |

*Primary Examiner*—Matthew O. Savage
*Attorney, Agent, or Firm*—Barry R. Lipsitz; Ralph F. Hoppin

[57]   ABSTRACT

In a bypass filter unit, in particular, for filtering supplies of hydraulic oil in a bypass flow, comprising a motor-driven pump and a fixedly mounted filter housing closeable by a cover and containing an exchangeable filter element, it is proposed that the drive of the pump, the pump and the filter housing be arranged coaxially with one another, with the end of the filter housing that is closeable by the cover pointing upwards, that the filter housing be directly connected to the pump, and that the filter housing form a receptacle for the clean oil while the filter element is being changed, so as to enable changing of the filter element and renewal of the filter in a simple way and without risk of soiling the clean oil side.

23 Claims, 6 Drawing Sheets

BYPASS-MOUNTED FILTER ASSEMBLY

This application is a continuation of International PCT Application No. PCT/EP96/00996 filed on Mar. 8, 1996.

BACKGROUND OF THE INVENTION

The invention relates to a bypass filter unit, in particular, for filtering supplies of hydraulic oil in a bypass flow, comprising a motor-driven pump and a fixedly mounted filter housing closeable by a cover and containing an exchangeable filter element.

In a large number of cases, the bypass filter units defined at the outset are used for cleaning supplies of hydraulic oil in hydraulic systems in order to clean the supply of hydraulic fluid outside of the working flow of the hydraulic fluid. The hydraulic fluid, in particular, the hydraulic oil, is taken from the oil supply, conveyed through the bypass filter unit, filtered and returned as clean oil to the hydraulic oil supply.

These bypass filter units can also be used for transferring hydraulic fluids by pumping (e.g. filling a hydraulic tank from a barrel).

In addition to the technology explained hereinabove with an exchangeable filter element, a second form of bypass filter unit operating with so-called spin-on filters, in which the filter element and the filter housing form one unit, has established itself.

In both technologies, however, the problem of changing the filter has been solved in an unsatisfactory way, in that either dirt particles deposited on the filter element are able to get back to the clean oil side or large quantities of hydraulic fluid have to be discarded on both the clean oil side and the dirty oil side when the filter is changed. In both cases, the handling of the filter elements, whether it be the filter elements as such, which are exchangeable, or the spin-on unit consisting of filter element and filter housing, involves a lot of work and often enough causes soiling of the environment with oil.

SUMMARY OF THE INVENTION

The object underlying the present invention is to introduce a bypass filter unit in which the changing of the filter elements and the renewal of the filter can be carried out in a simple way and without risk of soiling the clean oil side.

This object is accomplished in accordance with the invention in the bypass filter unit described at the outset by the drive of the pump, the pump and the filter housing being arranged coaxially with one another, with the end of the filter housing closeable by the cover pointing upwards, by the filter housing being directly connected to the pump, and by the filter housing forming a receptacle for the clean oil while the filter element is being changed.

With this bypass filter unit, the cover which closes the filter housing only has to be released, and the filter element with the dirty oil contained in the filter element removed and exchanged for a new filter element. The clean oil remains in the filter housing constituting a receptacle, while the dirty oil which has remained in the filter element is discarded together with the filter element. Dirt deposited on the filter element is thereby prevented from getting back into the supply of hydraulic oil together with the dirty oil.

The type of drive for the bypass filter unit is freely selectable, but gear pumps, preferably internal gear pumps or alternatively vane-cell pumps, are preferred as pumps.

In a particularly preferred embodiment of the invention, the hydraulic conveying element is directly attached to the motor shaft of the drive, i.e., without a coupling, which results in a structural simplification of the construction.

It is also preferable for the pump housing of the pump to have an integrated valve block. This again reduces the number of components and minimizes the structural height of the bypass filter unit.

Bypass filter unit constructions in which the pump housing is integrated into the filter housing bottom are particularly preferred. Herein the filter housing bottom forms the pump block in which the valve block is optionally integrated, and so a separate component between the drive and the filter housing is dispensed with. The filter housing bottom forming the pump housing then receives the hydraulic conveying element which is preferably directly seated on the motor shaft, and the flange on the motor forms the end of the pump housing.

Alternatively, the pump housing and the pump block, respectively, can be arranged and constructed on the attachment flange of the drive motor, and the filter housing bottom then forms the end of the pump chamber. If the pump chamber is integrated in the filter housing bottom, this requires very accurate machining of the filter housing bottom.

If the pump chamber and the pump block, respectively, are constructed in the motor flange, and the filter housing bottom forms the end of the pump chamber, the motor flange then has to be accurately machined, in particular, in view of the seat of the sealing, which, as a rule, will be a shaft sealing ring for sealing off the pump chamber from the motor shaft.

The filter housing is preferably directly attached to a flange of the drive, in particular, when the motor flange, on the one hand, or the filter housing bottom, on the other hand, forms the respective end of the pump chamber.

Alternatively, the pump housing can be integrated in a separate pump block which is mounted between the flange of the drive and the filter housing bottom. The motor flange, on the one hand, and/or the filter housing bottom, on the other hand, can then each form an end of the pump housing in the axial direction.

In a preferred embodiment of the invention, provision is made for the filter housing bottom, independently of its function described hereinabove, to be of integral construction with the filter housing. In particular, an aluminum extrusion part has proven its worth as filter housing. A very simplified possibility of retaining the residual dirty oil in the filter element consists in providing in the bottom of the filter element a valve which opens during operation of the bypass filter unit and allows the dirty oil to flow into the filter element, but closes during the changing of the filter element and thus retains in the filter element the residual dirty oil together with the dirt held back in the filter element.

Alternatively, provision may be made for the dirty oil space of the filter element to be fed dirty oil through an ascending line which forms part of the filter element and is exchanged with it. Dirty oil from the dirty oil side of the filter element is thereby prevented from flowing back together with the dirt held back in the filter element into the supply of hydraulic oil while the filter element is being changed.

A bypass valve is provided to prevent too high a pressure from building up during operation of the bypass filter unit or in the filter element in the event of saturation of the filter, and parts of the bypass filter unit from becoming damaged.

The bypass valve opens automatically at a specified pressure and then connects the pressure side of the pump to the suction side so that the oil circulates. With this arrangement, dirty oil is prevented from getting into the supply of hydraulic oil in an unfiltered state. This arrangement gains particular significance when transferring hydraulic fluid by pumping it from an external container which usually contains dirt to the supply of hydraulic fluid of a hydraulic system.

It is preferable for the bypass line designed in accordance with the invention to be arranged in the filter housing bottom.

The cover closing the filter housing will preferably be a cover which dips into the housing during closure. This very effectively prevents the oil contained in the housing from escaping and causing soiling of the outside of the bypass filter unit during exchange of the filter element.

Independently of its design, the cover can also be provided with a holding element for the filter element, with the filter element itself preferably being held rotatably in relation thereto. In this way, the filter element is removable without any implements from the filter housing together with the filter, without the staff having to take any special precautions regarding soiling.

In a particularly preferred embodiment of the invention, the holding element bears sealingly on the filter element and closes it sealingly at its end opposite the dirty oil inlet side so that the dirty oil still contained in the filter element cannot escape from it when the filter element is being changed.

The holding element is preferably designed so as to be insertable into a narrowing of the filter housing.

In a further advantageous design, the cover is of convex configuration. This has, for example, the advantage that an integrated grip can be arranged within the thus created recess accessible from the outside or in a hollow of this kind.

With a view to elimination of soiling, a cover comprising an external thread which is screwable into a complementary internal thread of the filter housing is particularly advantageous.

To prevent loss of oil spilling over from the filter housing when a new filter element is being inserted into the filter housing, provision is preferably made for the cover or the filter housing to include a blocking element, for example, a threaded section, which merely permits delayed travel of the cover through the last part of its closing path. This delays the last phase of the closure and insertion of the filter element into the filter housing in such a way that hydraulic oil which has remained in the filter housing after removal of a used filter element is prevented from splashing up.

In a further preferred embodiment of the invention, provision is made for the filter element to comprise a slightly spring-loaded valve which opens in the event of low back pressure on the clean oil side during the insertion of the filter element and creates a passage from the clean oil side of the filter element to its dirty oil side. In this way, the clean oil remaining in the filter housing during exchange of a used filter element can also use the empty space within the new filter element when it is being inserted and thus only brings about a significantly reduced increase in the level of the clean oil in the filter housing during the insertion of the new filter element. The clean oil is thereby prevented from splashing out over the still open or not yet fully closed filter housing in an alternative way to the above solution.

In a further preferred embodiment, the pressure line comprises a check valve which is preferably integrated in the filter housing bottom. If the pressure line leads to a hydraulic tank which is arranged higher than the bypass filter unit, the check valve installed in the pressure line prevents hydraulic fluid from being able to flow back from the higher located tank into the container of the bypass filter unit and from being able to get out through the then open cover when the filter element is being changed.

To check utilization of the filter, a connection for a manometer which is in flow connection with the dirty oil side is preferably provided in the filter housing bottom. The pressure on the pressure side can be read off at the manometer. It always rises noticeably when the capacity of the filter is exhausted. The manometer thus provides an indication of the level of soiling of the filter element. Since the operating pressures normally to be expected with the standard exchangeable filter elements and the pressure increases occurring with soiling are known, a marking can be made on the manometer to point out directly to the operating staff that the filter element is soiled and, therefore, has to be changed.

As an alternative or supplement thereto, it is possible to provide a differential pressure switch which, in the event a specified differential pressure between the inflow and outflow sides of the filter is exceeded, measures the pressure difference, and, if a given pressure difference is exceeded, delivers an electric signal which, inter alia, can be used to stop the bypass filter unit.

To seal off the individual elements from one another and, in particular, to seal the dirty oil filter side from the clean oil filter side, radial seals are preferably used, for example, for sealing the filter element from the filter housing and/or for sealing the cover from the filter housing. The radial seals have the advantage that a sealing contact between filter element and filter housing and between cover and filter housing can be achieved at different screw-in heights, and so the accuracy of the manufacture with respect to the tightly sealing seat is less critical.

These and further advantages of the invention are explained in greater detail hereinbelow with reference to the drawings.

BRIEF DESCRIPTION OF THE INVENTION

Figure 1:
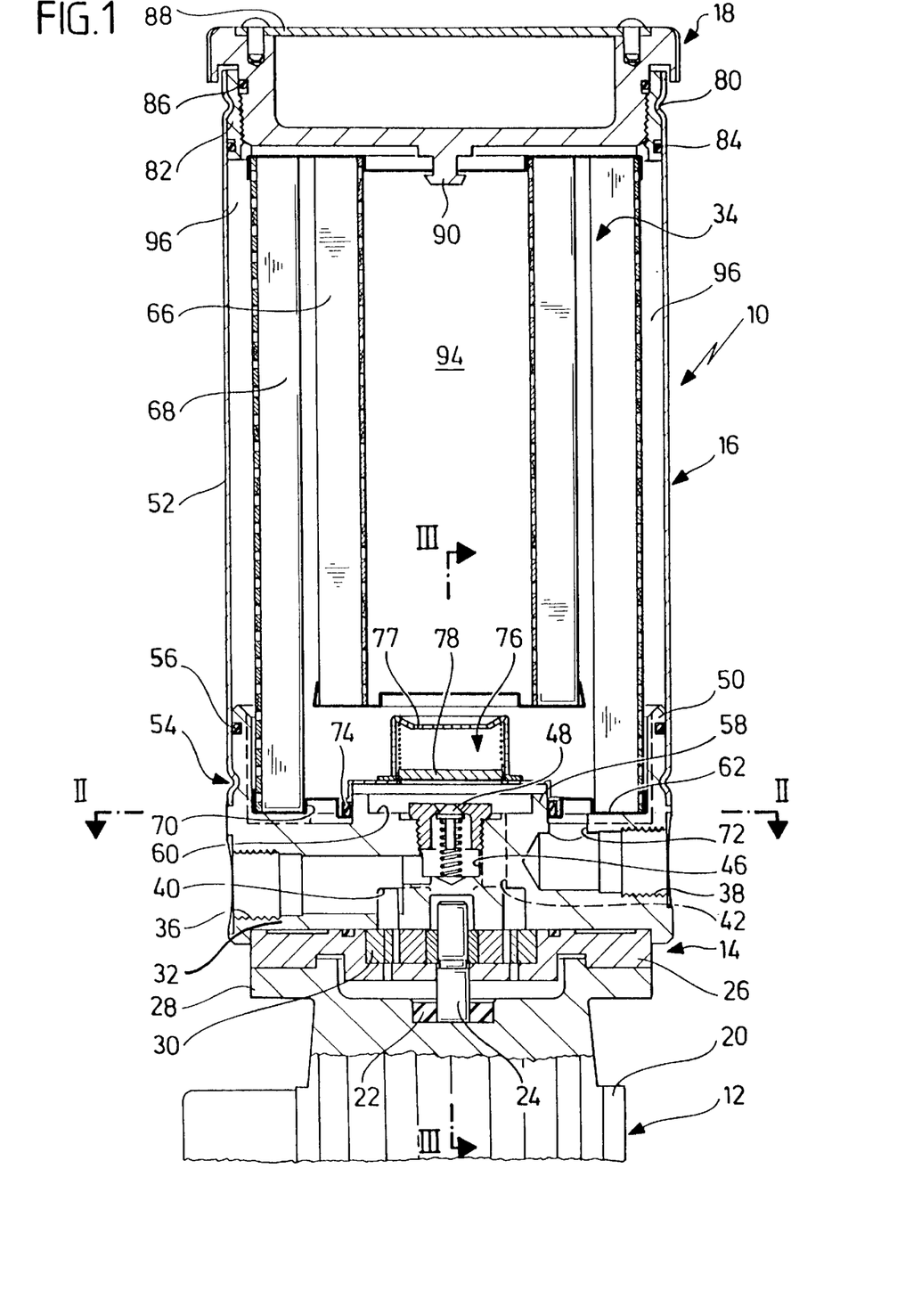
FIG. 1 a sectional view of an inventive bypass filter unit.

FIG. 1 shows a bypass filter unit designated in its entirety by reference numeral 10 with a motor drive 12, a pump 14 connected to the drive, a filter housing 16 and a cover 18 closing the filter housing 16 at the open end thereof. The motor drive or motor 12 comprises a motor shaft 24 which is sealed off from the motor housing 20 by means of a radial seal 22. The motor shaft 24 protrudes from the motor housing 20 and continues into a pump block 26 of the pump 14. The pump block of the pump 14 is arranged coaxially with the motor shaft 24 and is connected to the motor 12 via a flange 28 of the motor housing 20. The pump block 26 forms a chamber for receiving a set of gear wheels of the gear pump 14. On the upper side, the pump block 26 is closed off by a bottom 32 of the housing 16 which is arranged coaxially with the motor and the pump block 26 and is attached to the latter.

The end of the filter housing 16 opposite the filter housing bottom 32 is closeable by the cover 18. After opening of the filter housing 16 by removal of the cover 18, a filter element 34 arranged in the interior of the filter housing can be removed from the filter housing and exchanged for a new filter element.

In this embodiment of the invention, a separately constructed pump block 26 is provided to allow the rest of the bypass filter unit, i.e., the housing 16 and the pump 14 to be provided with optional drives without the construction of the pump 14 and the filter housing 16 having to be changed. The only precondition for the drives to be used is that the drive shaft 24 must protrude to an adequate extent from the housing 20 of the drive motor and must be appropriately designed for coupling with the set of gear wheels 30. The adaptation of the pump block 26 to the assembly flange 28 of the motor housing 20 can be realized relatively simply if the design of the flange 28 cannot be specified by way of the drive motor.

The filter housing 16 with its filter housing bottom 32 adjoins the pump block 26 directly and contains a suction line 36 for dirty oil and a discharge line 38 for clean oil in the filter housing bottom 32. The dirty oil inlet 36 is connected to the suction chamber of the pump block 26 via a kidney-shaped elongate hole 40 in the housing bottom 32, while an elongate hole 42 arranged in parallel thereto connects via the bores 42a the pressure side of the pump block 26 with the volume of the filter housing 16 receiving the filter element 34 (cf. FIGS. 2 and 3).

Also provided in the housing bottom 32 are bores which connect the volume within the annular collar 58 and the clean oil outlet side 38 to the circumference of the housing bottom where a differential pressure switch 44 is arranged for monitoring the state of utilization of the filter element 34. The bottom plate 32 also contains a bore which opens towards the interior of the filter housing and leads with its other end into the suction line 36 for the dirty oil. When the bypass filter unit 10 is in the assembled state, the bore 46 accommodates a check valve 48 which in the event of an excessive pressure increase in the filter housing opens and directly establishes a connection with the suction line 36 for the dirty oil so that when a filter element 34 is used up, a short-circuit occurs and the pump conveys directly from the clean oil side to the dirty oil side (circulation). Dirty oil is thereby prevented from entering the hydraulic oil supply in an unfiltered state.

The upper side of the housing bottom 32 carries on its outer circumference an upwardly protruding rim 50 on which a cylinder wall 52 of the housing 16 is mounted. The cylinder wall 52 is held mechanically on the rim 50 via a bead 54 and is usually also adhesively connected to the rim 50. Also arranged at the free end of the rim 50 is an O-ring seal 56 for additional sealing between the cylinder wall 52 and the rim 50 of the housing bottom 32. The filter housing bottom 32 also has an annular collar 58 lying further inwards concentrically with the rim 50. Adjacent to the annular collar 58 in the radial outward direction is an annular groove 60 which projects back from the upwardly directed surface 62 of the housing bottom 32. The filter element 34 which, in the present embodiment, is a double filter element with an inward candle filter 66 and an outward candle filter 68, is supported with the lower closure surface of the outer candle filter 68 on the surface 62 of the filter bottom 32, and at the opposite end the filter element 34 rests on the underside of the cover 18.

In the closed state, the cover 18 thus clamps the filter element 34 between itself and the surface 62 of the filter housing bottom 32 and thereby relieves the adhesive joints of the filter element.

The lower end of the filter element 34 has at the center thereof an inwardly projecting channel 70 which is arranged approximately concentrically with the annular groove 60 and together with the latter forms an annular channel. This annular channel is connected to the clean oil outlet 38 via a vertical bore 72.

Within the channel 70 the lower end of the filter element 34 has a groove for receiving an O-ring 74 which ensures sealing contact of the lower end of the filter element 34 with the outer surface of the annular collar 58. Arranged at the center of and within the annular collar 58, the filter element 34 has at its end to be arranged adjacent to the housing bottom 32 a check valve 76 which essentially consists of a sealing plate 78 held in a cage 77. This check valve is normally closed (cf. the state shown in FIG. 1), so the interior of the filter element 34 has no direct connection with the volume within the annular collar 58 of the housing bottom 32.

However, the pretension of the check valve is relatively low so that when the filter element 34 is inserted in the housing 16 of the bypass filter unit 10 and first contact is made with residual clean oil within the filter housing, the check valve opens so the inner volume of the new filter element 34 is available for the clean oil which has remained in the filter housing to flow into it, and so the clean oil does not have to travel up the otherwise only remaining small volume between the outside of the filter element 34 and the cylindrical wall 52. Oil is thereby prevented from spilling over from the bypass filter unit 10 and soiling the environment when the filter element 34 is quickly inserted in the filter housing 16.

At the upper end, the cylindrical wall 52 of the filter housing 16 carries a ring 82 which is mechanically secured via a bead 80. The ring 82 has an internal thread into which the cover 18 can be screwed with its complementary external thread. The internal thread of the ring 82 or the complementary thread of the cover 18 acts as a blocking element to permit delayed travel of the cover through the last part of its closing path, thereby preventing oil from spilling over from the filter housing 16 when a new filter element is inserted into the filter housing. At its lower end facing the housing interior, the ring 82 is sealed off from the cylinder wall 52 via an O-ring 84. At the upper end of its external thread, the cover 18 itself also carries an O-ring 86 which seals off the outer wall of the cover from the ring 82.

The cover 18 is of convex shape, and a handle clasp 88 which facilitates turning and holding of the cover 18 is attached over the cavity formed on the upper side. At the center of its underside, the cover 18 carries a downwardly protruding nipple 90 which can snap lockingly into a corresponding opening on the upper side of the filter element 34 (cf. FIG. 1a), so the cover can be simultaneously used as a handle for the filter element 34.

Figure 1A:
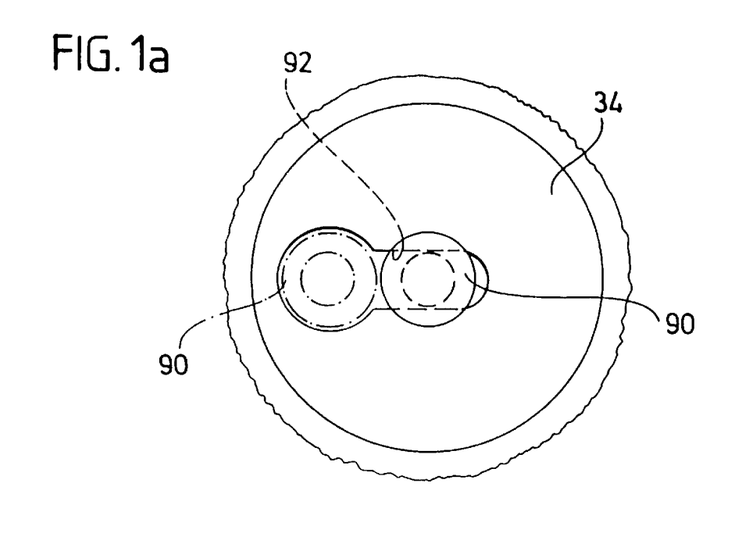
FIG. 1a a plan view of a filter element holder.

Once the cover 18 has been removed together with the filter element 34 from the filter housing 16, the nipple 90 can be moved towards the widened part in the elongate hole 92 and the cover thus released from the filter element 34.

Figure 2:
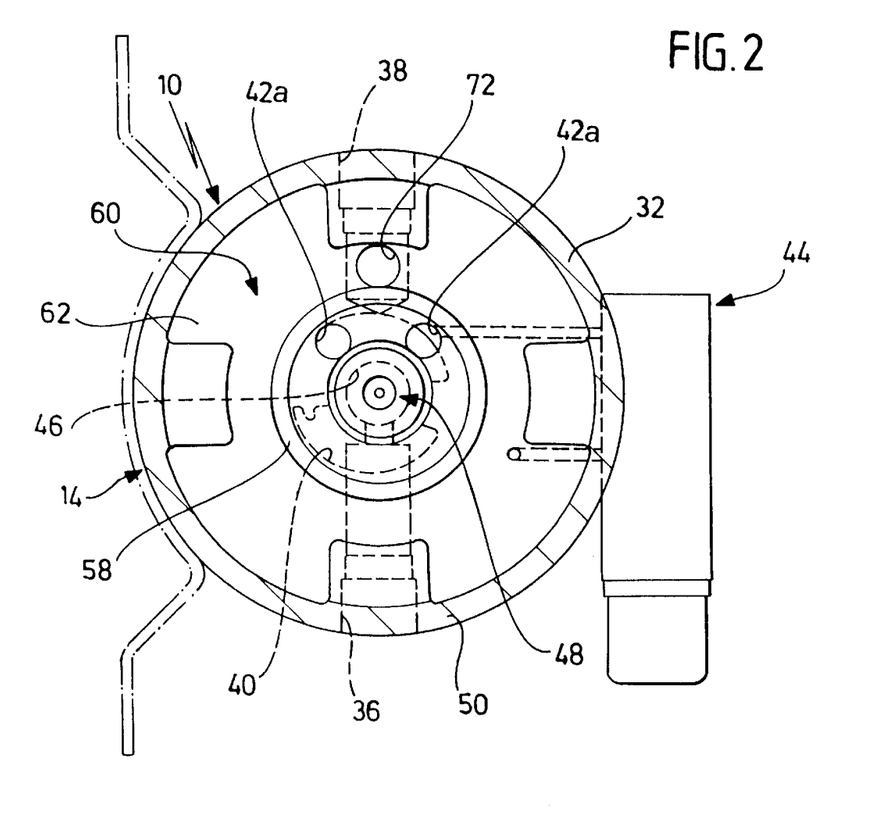
FIG. 2 a plan view of the bypass filter unit of FIG. 1.
Figure 3:
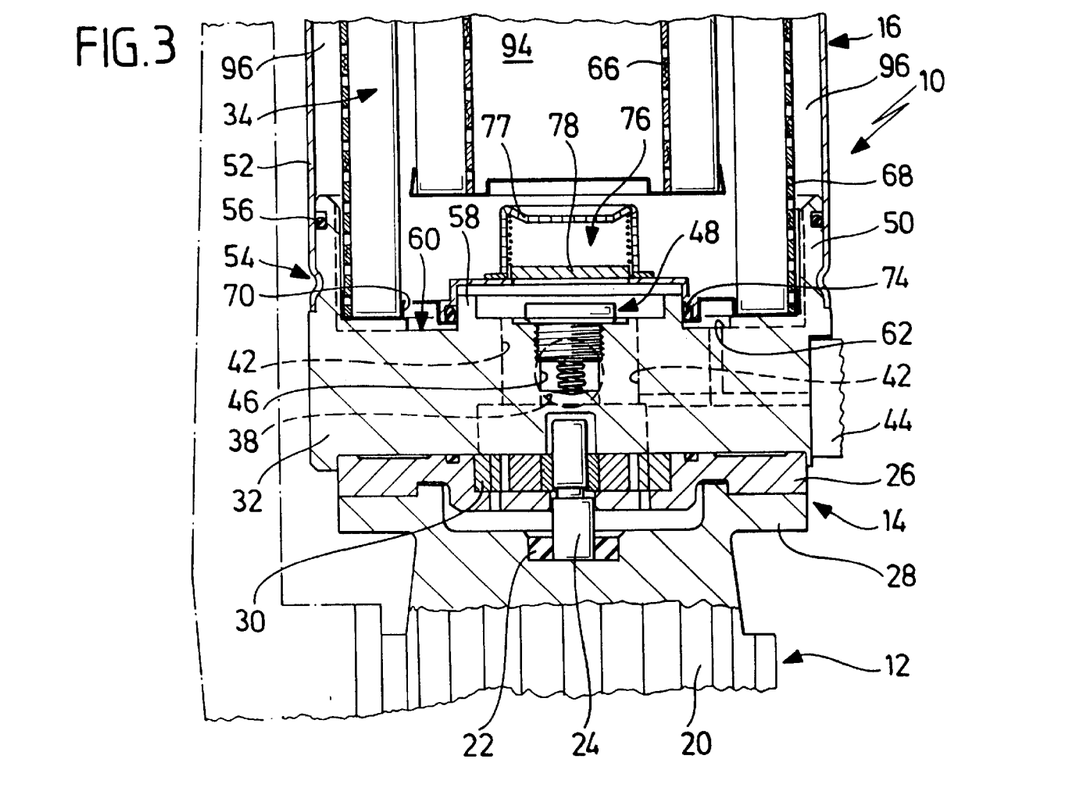
FIG. 3 a simplified sectional view along line III—III in FIG. 1.

The oil flow during operation of the bypass filter unit according to FIG. 1 in conjunction with FIGS. 2 and 3 will first be explained hereinbelow in greater detail.

The dirty oil first enters the bypass filter unit 10 through the dirty oil line 36 and in the pressure chamber formed by the pump block 26 is conveyed by the set of gear wheels 30 via the axial bores 42a into the annular space within the annular collar 58. Herein the dirty oil raises the sealing plate 78 within the cage 77 and flows into the interior of the filter element 34. There it flows through the inner filter cartridge into the inside cylindrical space 94 and outwards through the outer filter cartridge into the annular space 96 between the filter element 34 and the cylinder wall 52, respectively. From the space 94 it flows through channels between the cover 18 and the upper end of the filter end 34, if applicable, into the annular space 96 and from there in the direction towards the housing bottom 32 through the annular channel formed by the recess 70 and the annular groove 60 via the bore 72 into the clean oil outlet 38.

If too high a pressure is caused within the volume of the annular space 58 owing to excessive soiling of the filter element 34, the check valve 48 opens and causes a short-circuit in the dirty oil before it enters the filter element 34.

The differential pressure switch 44 mentioned hereinabove is used to avoid unnecessary operation of the bypass filter unit. When a specified pressure difference between dirty oil side and clean oil side is exceeded, which corresponds to an excessive utilization of the filter element 34, the differential pressure switch 44 delivers an electric signal which, inter alia, can also be used to stop the bypass filter unit.

Figure 4:
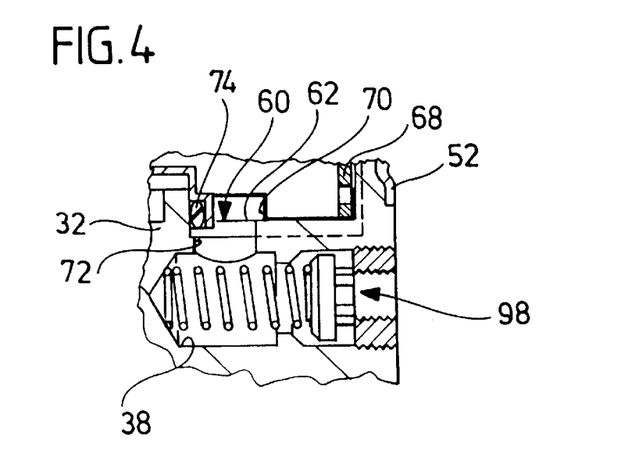
FIG. 4 a detail of a return flow connection.

When changing the filter element 34 from a tank at a higher location, to prevent oil from flowing back through the clean oil line 38 into the annular space 96 and escaping via the then open container 52 into the environment, a check valve is installed in the clean oil outlet, as is apparent from the detail shown in FIG. 4, to close the clean oil outlet in the inward direction in the pressureless state.

Figure 5:
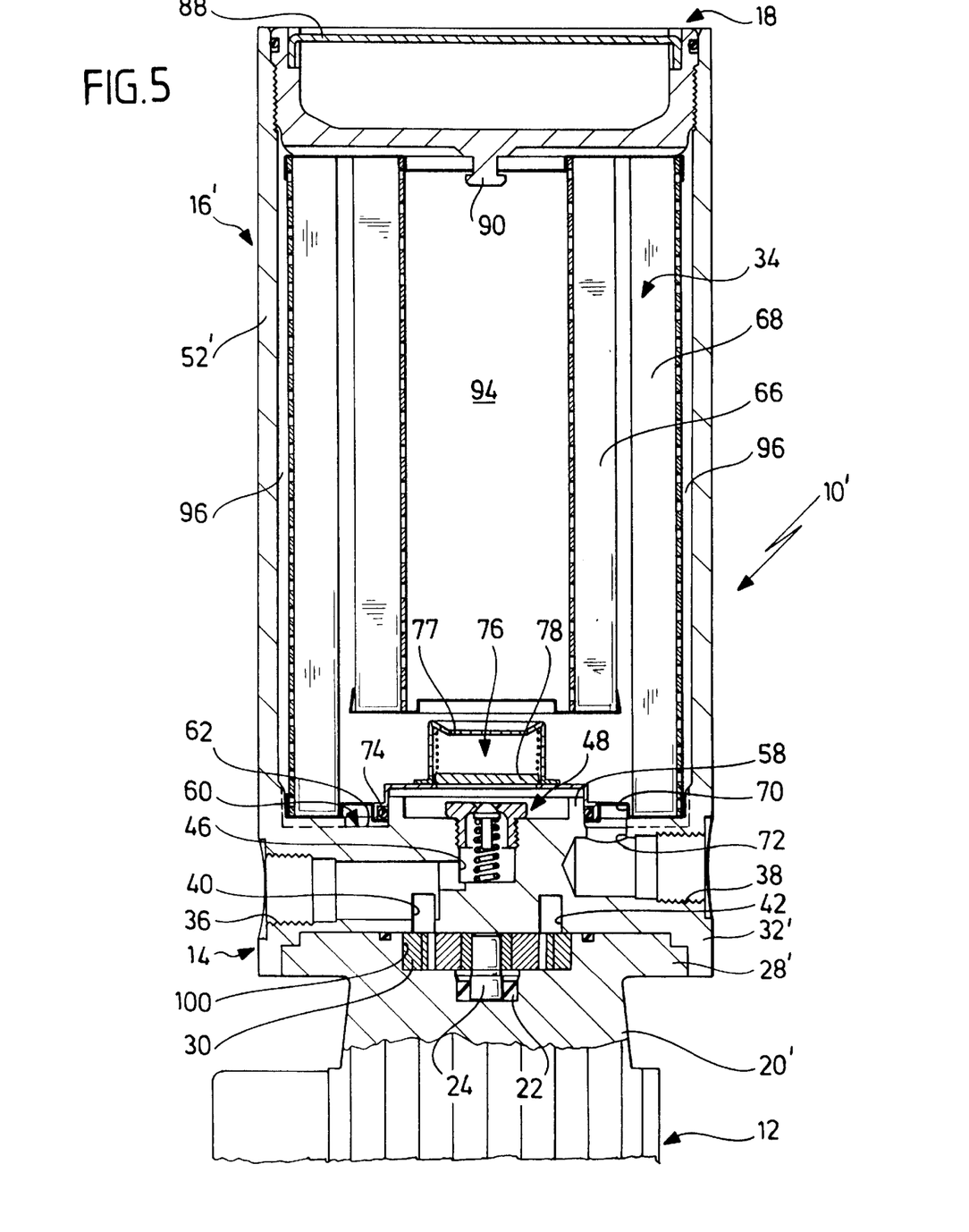
FIG. 5 a sectional view of an alternative embodiment of the invention.

FIG. 5 represents a second embodiment of the present invention, which corresponds to the bypass filter unit shown in FIG. 1 with respect to the functional design, but is of different structural design.

In FIG. 5, a filter housing bottom 32' which is constructed as an integral part of a cylinder wall 52' of a filter housing 16' is directly connected to the motor housing 20'. The internal design, in particular, the position and the dimensions of the size of the bores in the filter housing bottom 32', corresponds essentially to that of the filter housing bottom 32 of FIG. 1, and, therefore, the functional parts and functional areas contained therein bear the same reference numerals as in FIG. 1.

The same applies to the inserted filter element and the cover 18.

However, in the case of the embodiment of FIG. 5, the motor housing 20' ends with a flange 28' which is optionally constructed as an integral part of the motor housing 20' and has a central recess 100 which receives the set of gear wheels 30 of the pump 14. In this embodiment, a separate pump block 26 is, therefore, unnecessary, and the motor housing 20' is directly connected to the filter housing 16' via its filter housing bottom 32'.

In this embodiment, as in the embodiment shown in FIG. 1, instead of the double filter element 34, a single filter element can, of course, also be used, and the inner candle filter 66 is then dispensed with.

Figure 6:
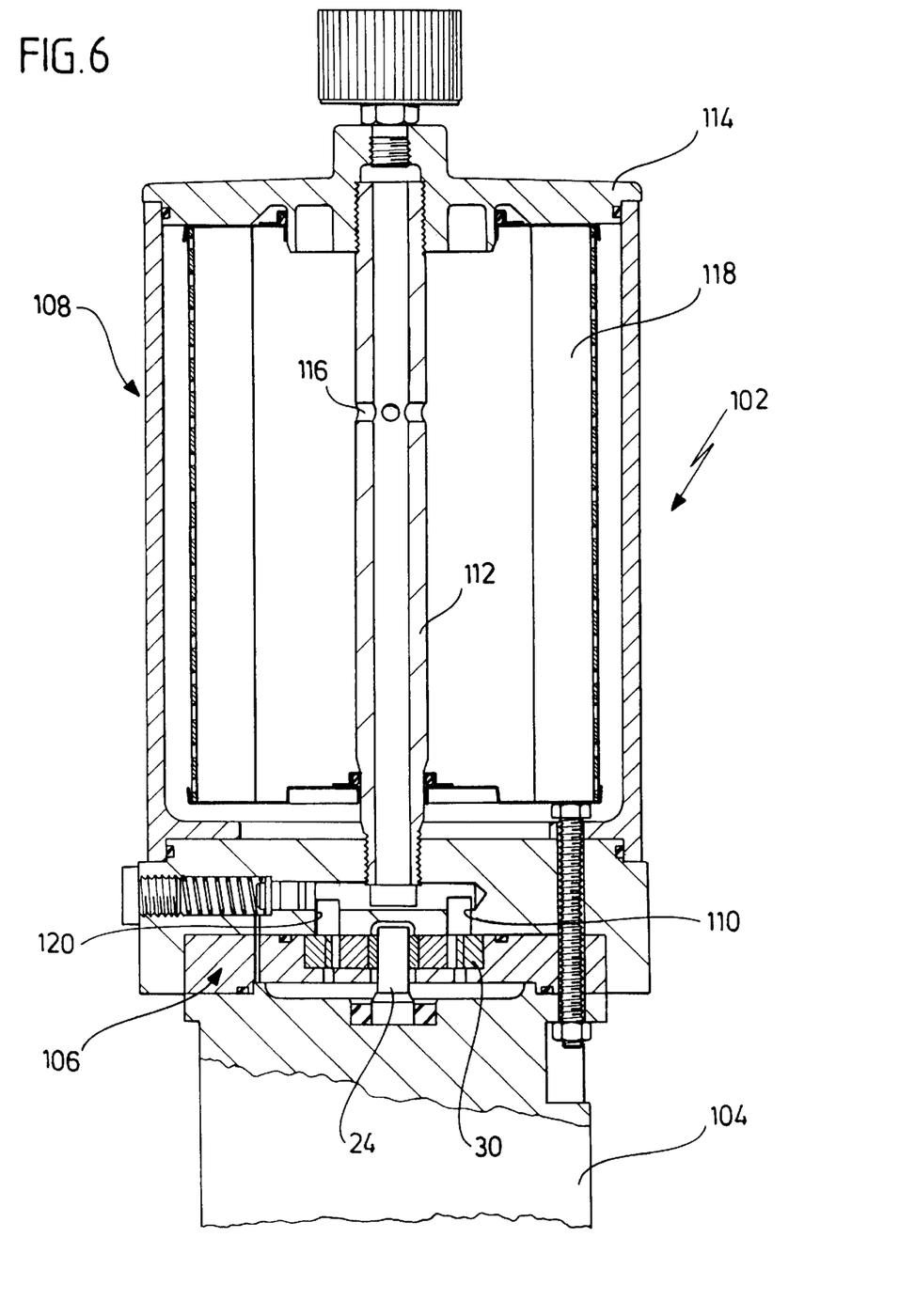
FIG. 6 a further embodiment of the inventive bypass filter unit.

FIG. 6 shows a further alternative embodiment of the present invention, in which a bypass filter unit 102 is equipped with a drive motor 104 of a pump 106 and a filter housing 108, which, as in the embodiments shown in FIGS. 1 and 5, are arranged vertically and coaxially in relation to one another.

The dirty oil inlet and the clean oil outlet are not visible in this illustration. From the dirty oil side the oil first flows via the pump 106 and its pressure side 110 via a central bore in the bottom of the housing 108 into an ascending line 112 which extends vertically as far as the upper end of the housing 108 and is connected via a screw connection to a cover 114 which closes the housing 108 at the top. In the upper third, the ascending line 112 has continuous transverse bores 116 via which the dirty oil flows into the interior of a filter element 118. After passing through the filter element 118, the clean oil collects in a cylindrical space between the filter element 118 and the housing wall of the housing 108 and flows off through a clean oil outlet which is not visible in this illustration. With the ascending line 112 connected to the cover 114 it is ensured that residual dirty oil contained in the filter element 118 with dirt particles dissolved therein cannot flow back into the housing 108 when the cover 114 is to be opened and the filter element 118 exchanged. The filter element is sealingly supported, on the one hand, on the cover 114 and, on the other hand, at its lower part on the ascending line 112. The ascending line 112 can be used simultaneously to attach the cover 114 to the bottom plate of the housing 108 by the ascending line being provided with an external thread at its lower end which is complementary with an internal thread of a bore in the bottom plate of the housing 108 for receiving the external thread.

Figures 7, 8:
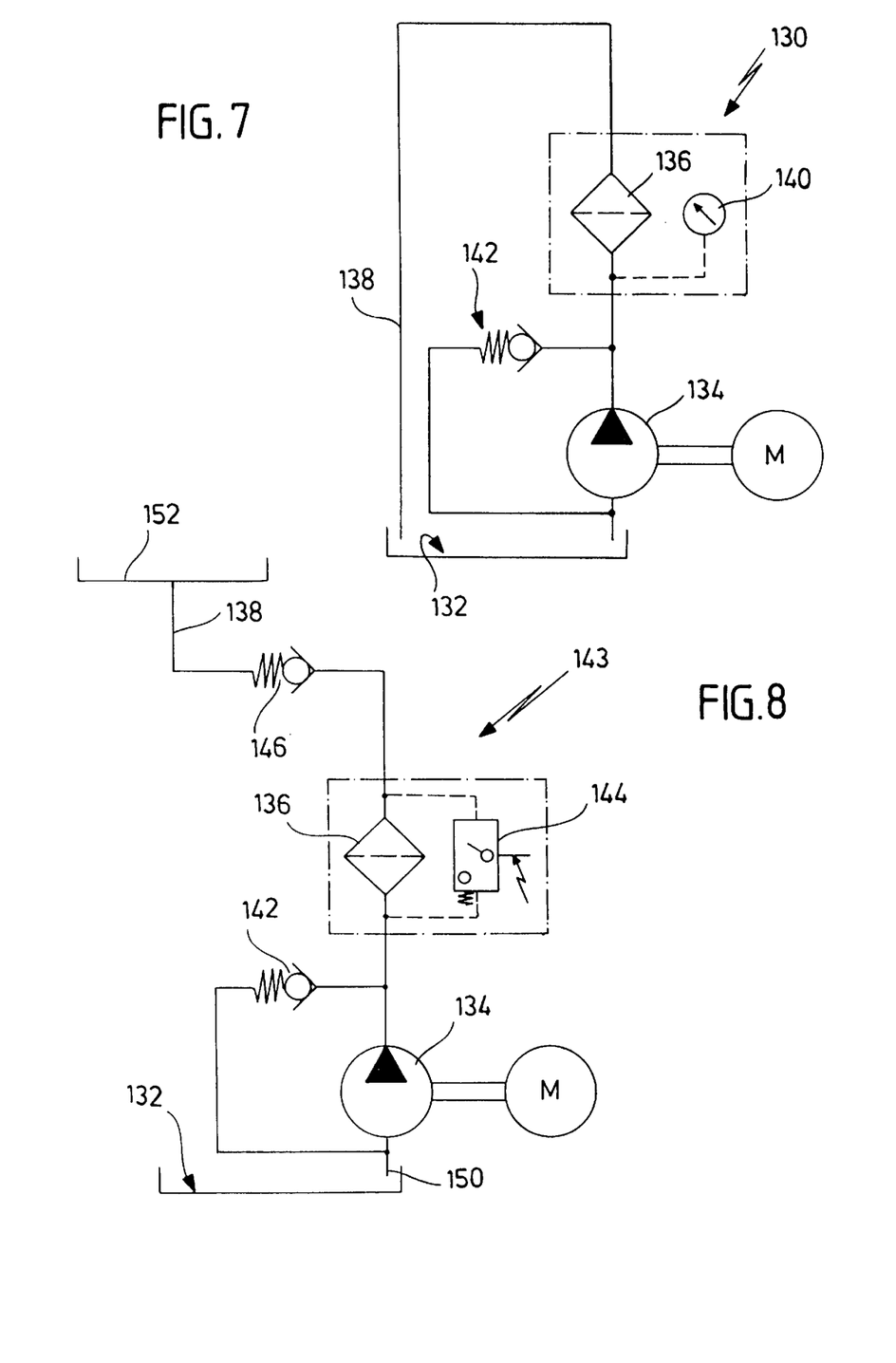
FIG. 7 a block circuit diagram of an inventive bypass filter unit.
FIG. 8 a block circuit diagram of an alternative embodiment of the invention.

Finally, possibilities, in principle, for the layout of the flow paths of the bypass filter system according to the present invention are illustrated in FIGS. 7 and 8 with the simplest version being shown in FIG. 7. Herein, a bypass filter unit 130 takes oil from an oil supply 132 and pumps it by means of a pump 134 to a filter element 136 and through a return flow line 138 back to the oil supply 132. The state of utilization of the filter element 136 can be read off at a manometer 140 which monitors the pressure of the filter element 136 at the inlet side. If the pressure at the inlet side of the filter element 136 exceeds normal values, this indicates exhaustion of the filter and too high a utilization level of the filter and so it has to be exchanged. To avoid destruction of the filter and/or overloading of the pump 134 in such cases, a check valve 142 is provided to directly connect the outlet side of the pump 134 with the inlet side 150. In such a case, the circulation of the dirty oil, therefore, leads directly from the outlet side of the pump to the inlet side 150 of the pump.

FIG. 8 shows a more complex circuitry in which identical elements bear the same reference numerals as in FIG. 7.

Instead of the manometer 140, a differential pressure gauge 144 is used. The differential pressure gauge 144 monitors the pressure difference between the inlet and outlet sides of the filter element 136 and in the event a specified differential pressure value is exceeded, delivers an electric signal which, inter alia, can also be used to stop the motor of the pump 134. A check valve 146 is additionally provided in the return flow line 138 to prevent oil from running back from the higher located tank 152 through the return line 138 into the filter element 136.

What is claimed is:

1. A filter, comprising:
   a pump motor including a shaft coaxially arranged about a central vertical axis;
   a pumping member attached to an end portion of the shaft;

a pump housing disposed above the pump motor and including a a pump chamber containing the pumping member;

a filter housing disposed above the pump housing and having a bottom wall including a lower surface for closing the pump chamber, a side wall coaxially surrounding the central vertical axis and defining a filter chamber, an open top end, inlet means communicating with an inlet side of said pump chamber for directing unfiltered oil to the inlet side of said pump, passage means for directing pressurized unfiltered oil from a pressure side of said pump passage into said filter chamber, and outlet means for directing filtered oil out of said filter chamber;

a cover for closing the open top end of said filter housing;

a tubular filter element disposed within said filter chamber including a perforate side wall coaxially arranged about said axis, a closed top wall, and a bottom wall including a central opening coaxially surrounding said axis, wherein said tubular filter defines an internal chamber for connection to passage means, whereby said filter element defines a clean space for filtered oil disposed between an interior surface of said housing and an exterior surface of said filter element and a dirty space for unfiltered oil in said internal chamber;

releasable connection means for sealingly connecting said internal chamber to said passage means via the central opening of said tubular filter; and retaining means carried by said tubular filter element for preventing the flow of dirty oil from the internal chamber of said tubular filter element through said central opening upon release of said connection means, whereby the contamination of filtered oil within said clean space by unfiltered oil within said dirty space upon removal of said tubular filter element from the housing is prevented.

2. The filter of claim 1, wherein:

the pump comprises a hydraulic conveying element which is directly attached to a motor shaft of the pump motor.

3. The filter of claim 1, wherein:

a pump block is integrated in the pump housing of the pump;

said pump block forming a chamber for receiving a set of gear wheels associated with said pump.

4. The filter of claim 3, wherein:

the pump housing is integrated in a bottom portion of the filter housing.

5. The filter of claim 4, wherein:

the filter housing is directly attached to a flange of the pump motor.

6. The filter of claim 1, wherein:

the pump housing is integrated in a flange of the pump motor which serves to mechanically connect the pump motor to the filter housing.

7. The filter of claim 1, wherein:

the filter housing and the filter housing bottom are of integral construction.

8. The filter of claim 1, wherein:

the pump housing is formed by a pump block mounted between the pump motor and the filter housing.

9. The filter of claim 1, wherein:

the filter housing bottom wall contains said inlet means and said outlet means.

10. The filter of claim 9, wherein:

the retaining means is a valve arranged in a bottom portion of the filter element.

11. The filter of claim 10, wherein:

the retaining means is an ascending line integrated in the filter element.

12. The filter of claim 1, wherein:

the filter housing is closeable by said cover; and said cover is adapted to dip into the open top end of the housing opposite the bottom wall of the housing.

13. The filter of claim 1, wherein:

the cover is provided with a holding element for locking onto an upper portion of the filter element to allow said filter element to be lifted.

14. The filter of claim 13, wherein:

the holding element is insertable into a narrowing of the filter housing.

15. The filter of claim 1, wherein:

the cover rests sealingly on the filter housing.

16. The filter of claim 1, wherein:

the cover has a convex downwardly-facing surface.

17. The filter of claim 1, wherein:

the cover comprises a handle integrated therein.

18. The filter of claim 1, wherein:

the cover comprises an external thread which is screwable into a complementary internal thread of the filter housing.

19. The filter of claim 1, wherein:

the cover or the filter housing comprises a blocking element which merely permits delayed travel of the cover through the last part of its closing path.

20. The filter of claim 1, wherein the filter element comprises:

a check valve which opens in the event of low back pressure on a clean oil side of the filter element during the insertion of the filter element, and creates a passage from the clean oil side of the filter element to a dirty oil side of the filter element.

21. The filter of claim 1, wherein:

the outlet means of the filter housing comprises a check valve which is integrated in the bottom wall of the filter housing.

22. The filter of claim 1, further comprising:

a differential pressure switch for delivering electric signals when a specified differential pressure value is exceeded between said inlet means and said outlet means.

23. The filter of claim 1, wherein:

the filter element rests sealingly against the filter housing by means of radial seals.

* * * * *